United States Patent
Koganehira et al.

(10) Patent No.: US 7,462,231 B2
(45) Date of Patent: Dec. 9, 2008

(54) INK SET

(75) Inventors: Shuichi Koganehira, Matsumoto (JP); Hironori Sato, Shiojiri (JP); Akira Mizutani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/732,082

(22) Filed: Apr. 2, 2007

(65) Prior Publication Data

US 2007/0266887 A1 Nov. 22, 2007

(30) Foreign Application Priority Data

Apr. 3, 2006 (JP) .............................. 2006-102098
Mar. 14, 2007 (JP) .............................. 2007-065513

(51) Int. Cl.
*C09D 11/02* (2006.01)

(52) U.S. Cl. ................. 106/31.6; 106/31.86; 106/31.89

(58) Field of Classification Search ................ 106/31.6, 106/31.86, 31.89
See application file for complete search history.

(56) References Cited

U.S. PATENT DOCUMENTS

| | | | | |
|---|---|---|---|---|
| 6,843,840 | B2* | 1/2005 | Kataoka et al. | 106/31.6 |
| 2003/0116055 | A1* | 6/2003 | Kubota et al. | 106/31.27 |
| 2005/0203210 | A1* | 9/2005 | Kataoka et al. | 523/160 |
| 2005/0284329 | A1* | 12/2005 | Jackson et al. | 106/31.6 |
| 2005/0284330 | A1* | 12/2005 | Jackson | 106/31.6 |
| 2007/0097193 | A1* | 5/2007 | Ma et al. | 347/100 |
| 2007/0242118 | A1* | 10/2007 | Koganehira et al. | 106/31.6 |

FOREIGN PATENT DOCUMENTS

JP         10-123760         5/1998

(Continued)

OTHER PUBLICATIONS

Patent Abstract of Japanese Patent Application No. 2003-160750 Dated Jun. 6, 2003.

(Continued)

*Primary Examiner*—Helene Klemanski
(74) *Attorney, Agent, or Firm*—Ladas and Parry LLP

(57) ABSTRACT

An ink set, including at least three colors of ink consisting of a yellow ink, in which the hue angle $\angle H°$ defined in the CIELAB color space on a recording medium is within the range of about 80° C. to about 110° C., magenta ink, in which the hue angle $\angle H°$ is within the range of about 330° to about 360°, and a cyan ink, in which the hue angle $\angle H°$ is within the range of about 230° to about 260°, and the following ink (A) and the following ink (B): ink (A): ink in which the hue angle $\angle H°$ is within the range of about 0° to about 80°; and, ink (B): ink in which the hue angle $\angle H°$ is within the range of about 0° to about 80° (wherein, the ink (A) has higher chroma and lower brightness than the magenta ink, the ink (B) has higher chroma and higher brightness than the magenta ink and has higher chroma and lower brightness than the yellow ink, the hue angle ($\angle H°$) is determined according to $\angle H° = \tan^{-1}(b^*/a^*) + 180$ (when $a^* < 0$) or according to $\angle H° = \tan^{-1}(b^*/a^*) + 360$ (when $a^* > 0$), and $a^*$ and $b^*$ represent a perceptive chromaticity index in the CIELAB color space).

19 Claims, 11 Drawing Sheets

FOREIGN PATENT DOCUMENTS

| | | |
|---|---|---|
| JP | 99/005230 | 2/1999 |
| JP | 02/100959 | 12/2002 |
| JP | 2003-123760 | 4/2003 |
| JP | 2003-160750 A | 6/2003 |
| JP | 2003-292835 | 10/2003 |
| JP | 2004-066558 | 4/2004 |
| JP | 2004-276397 | 10/2004 |
| JP | 2005-314546 | 11/2005 |
| JP | 2006-0328140 | 12/2006 |
| WO | 99/05230 | 2/1999 |
| WO | 02/100959 A1 | 12/2002 |

OTHER PUBLICATIONS

Patent Abstract of Japanese Patent Application No. 2004-066558 Dated Mar. 4, 2004.
Patent Abstract of Japanese Patent Application No. 2004-276397 Dated Oct. 7, 2004.
Patent Abstract of Japanese Patent Application No. 2005-314546 Dated Nov. 10, 2005.
Patent Abstract of Japanese Patent Application No. 10-123760 Dated May 15, 1998.
Patent Abstract of Japanese Patent Application No. 2003-123760 Dated Apr. 25, 2003.
Patent Abstract of Japanese Patent Application No. 2006-328140 Dated Apr. Dec. 7, 2006.

* cited by examiner

— EXAMPLE 1     ▨ COMPARATIVE EXAMPLE 1

INK SET

BACKGROUND

1. Technical Field

The present invention relates to an ink set, and more particularly, to an ink set capable of satisfying granularity suppression, false contour suppression, prismatic light suppression, color reproducibility and gloss during recording.

2. Related Art

In the past, three-color-ink sets provided with yellow (Y), magenta (M) and cyan (C) ink, and four-color ink sets in which black (K) ink is further added, have been supplied as ink sets for color ink jet recording. In addition, ink sets provided with red (R) and/or violet (V) ink in addition to the YMC ink have been proposed to enhance color reproducibility of the resulting recorded articles (see, for example, International Publication WO 02/100959). In addition, ink sets have also been proposed provided with two colors of orange (Or) and green (Gr) special-color ink in addition to the YMC ink (see, for example, International Publication WO 99/05230).

However, although gloss is superior in the case of recording using the ink set of International Publication WO 02/100959, further suppression of interference color (bronzing) is desired. In addition, since the pigment solid component is 3% by weight or more in the case of recording using the ink set of International Publication WO 99/05230, further improvement of gloss is desired on printing paper-based glossy media (for example, Photo Paper <Gloss> (Product No. KA420PSK) (Seiko Epson Corp.).

In the case of previous ink sets, contrast of human skin color was not adequately realized in recorded samples. Namely, previous ink sets had problems such as deterioration of granularity during color reproduction of dark areas of human skin color, the occurrence of false contours, the occurrence of a phenomenon in which dark areas of human skin color become greenish (green transfer) as a result of local superposition of C ink dots and Y ink dots recorded for color reproduction, and increased appearance of rainbow colors (prismatic light) resulting from mixing of the green of superimposed dots and the red of interference color at dark areas of human skin color due to the occurrence of reddish interference color when the concentration of the pigment solid component of the C ink is 3% by weight or less. These problems are particularly prominent in portraits of infants photographed with improper exposure and so on.

Therefore, an advantage of some aspects of the invention is to provide an ink set capable of satisfying granularity suppression, false contour suppression, prismatic light suppression, color reproducibility and gloss during recording.

SUMMARY

As a result of conducting extensive studies, the inventors of the present invention found that an ink set provided with a specific YMC ink, a specific ink (A) and a specific ink (B) is able to satisfy granularity suppression, false contour suppression, prismatic light suppression, color reproducibility and gloss during recording, thereby leading to completion of the present invention.

Namely, the present invention provides: (1) an ink set provided with at least three colors of ink consisting of a yellow ink, in which the hue angle $\angle H°$ defined in the CIELAB color space on a recording medium is within the range of about 80° C. to about 110° C., magenta ink, in which the hue angle $\angle H°$ is within the range of about 330° to about 360°, and a cyan ink, in which the hue angle $\angle H°$ is within the range of about 230° to about 260°, and the following ink (A) and the following ink (B):

ink (A): ink in which the hue angle $\angle H°$ is within the range of about 0° to about 80°; and, ink (B): ink in which the hue angle $\angle H°$ is within the range of about 0° to about 80°;

(wherein, the ink (A) has higher chroma and lower brightness than the magenta ink, the ink (B) has higher chroma and higher brightness than the magenta ink and has higher chroma and lower brightness than the yellow ink, the hue angle ($\angle H°$) is determined according to $\angle H°=\tan^{-1}(b^*/a^*)+180$ (when $a^*<0$) or according to $\angle H°=\tan^{-1}(b^*/a^*)+360$ (when $a^*>0$), and $a^*$ and $b^*$ represent a perceptive chromaticity index in the CIELAB color space);

(2) the ink set described in (1) above, wherein the yellow ink and the cyan ink contain a complex pigment;

(3) the ink set described in (1) above, wherein the yellow ink contains C.I. pigment yellow 74 and C.I. pigment yellow 129 as pigments, and the cyan ink contains C.I. pigment blue 15:4 as pigment;

(4) the ink set described in any of (1) to (3) above, wherein the cyan ink contains a white pigment;

(5) the ink set described in any of (1) to (4) above, wherein the magenta ink contains a solid solution of γ-type C.I. pigment violet 19 and C.I. pigment red 202 as pigment;

(6) the ink set described in any of (1) to (5) above, wherein the ink (A) is a red ink;

(7) the ink set described in any of (1) to (6) above, wherein the ink (A) is a red ink containing C.I. pigment red 177 and/or C.I. pigment red 179 as pigments;

(8) the ink set described in any of (1) to (7) above, wherein the ink (B) is an orange ink;

(9) the ink set described in any of (1) to (8) above, wherein the ink (B) is an orange ink containing C.I. pigment orange 43 and/or C.I. pigment red 242 as pigments;

(10) the ink set described in any of (1) to (9) above, wherein the mixing ratio of C.I. pigment orange 43 to C.I. pigment red 242 in the ink (B) is 4:1 to 2:1;

(11) the ink set described in any of (1) to (10) above, wherein the ink set is further provided with a blue ink containing C.I. pigment blue 15:1 and/or C.I. pigment violet 23 as pigments;

(12) the ink set described in any of (1) to (11) above, wherein the pigment solid component concentration in each ink is less than 3% by weight;

(13) the ink set described in any of (1) to (12) above, wherein the ink set is further provided with a black ink, and the black ink contains C.I. pigment black 7 as pigment;

(14) the ink set described in any of (1) to (13) above, wherein the ink set is further provided with a black ink, and the pigment solid component concentration of the black ink is 1% by weight or less;

(15) the ink set described in any of (1) to (14) above, wherein the ink set is further provided with a clear ink;

(16) the ink set described in any of (1) to (15) above, wherein the ink set contains an optionally branched alkanediol having 5 to 10 carbon atoms at 3 to 15% by weight;

(17) the ink set described in any of (1) to (16) above, wherein the ink set contains a surfactant in the form of a polyorganosiloxane;

(18) the ink set described in any of (1) to (17) above, wherein the ink set contains a surfactant in the form of a polyorganosiloxane represented by the following general formula:

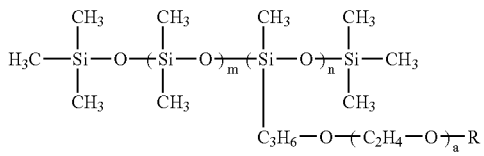

(wherein, R represents a hydrogen atom or a methyl group, a represents an integer of 7 to 11, m represents an integer of 20 to 70, and n represents an integer of 2 to 5); and,

(19) the ink set described in (18) above, wherein the ink set further contains a surfactant in the form of a polyorganosiloxane represented by the following general formula:

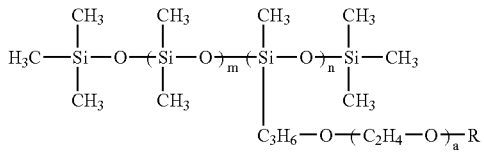

(wherein, R represents a hydrogen atom or a methyl group, a represents an integer of 9 to 13, m represents an integer of 2 to 4, and n represents an integer of 1 to 2).

DESCRIPTION OF EXEMPLARY EMBODIMENTS

Figure 1:
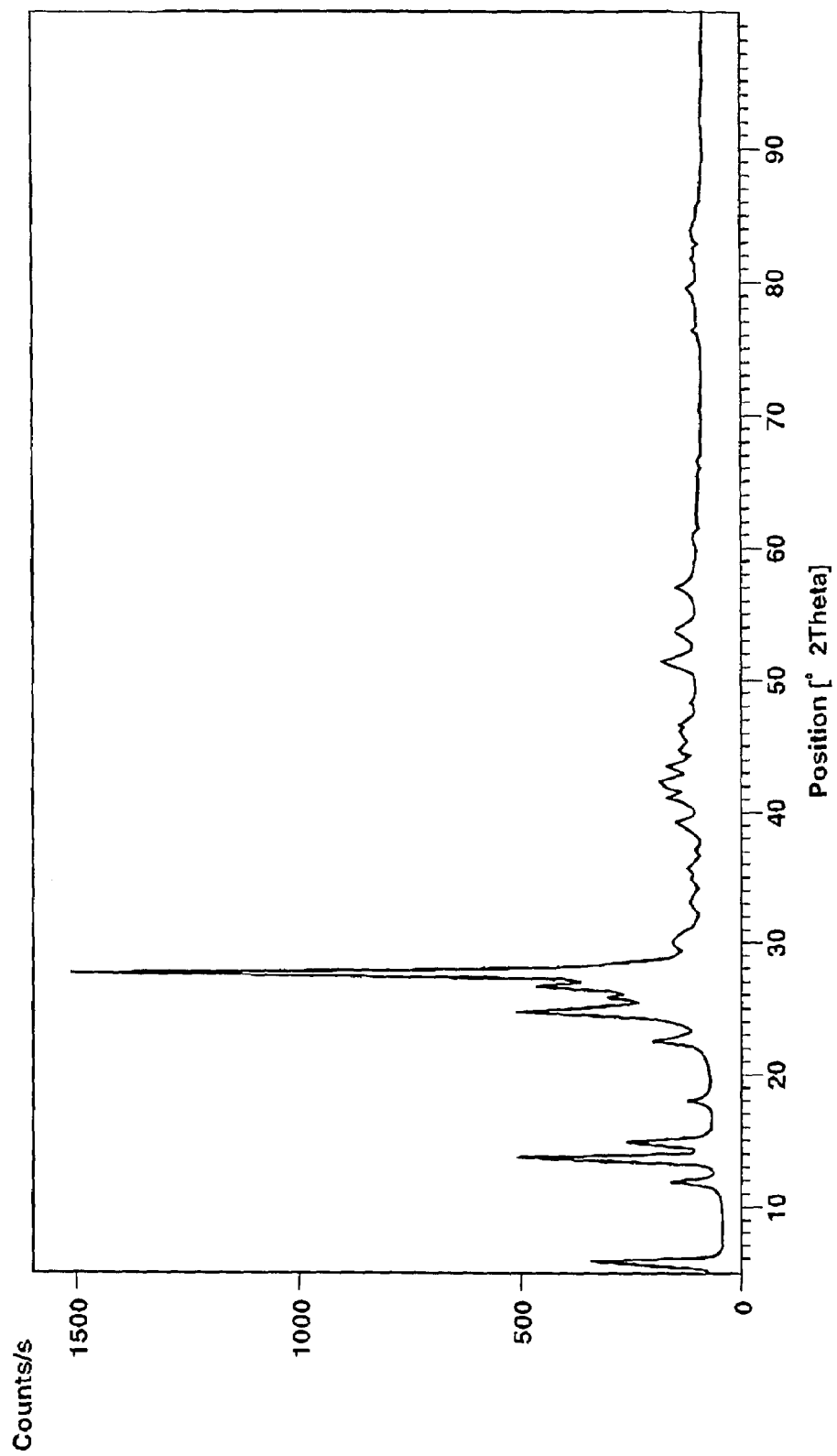
FIG. 1 is a graph showing the results of an X-ray powder diffraction analysis of a preferable example of a solid solution contained in a magenta ink.

The following provides an explanation of embodiments of the present invention. The following embodiments are examples for explaining the present invention, and are not intended to limit the present invention to these embodiments only. The present invention can be carried out in various forms provided they do not deviate from the gist thereof.

The ink set of the present invention is provided with at least three colors of ink consisting of a yellow ink, in which the hue angle $\angle H°$ defined in the CIELAB color space on a recording medium is within the range of about 80° C. to about 110° C., magenta ink, in which the hue angle $\angle H°$ is within the range of about 330° to about 360°, and a cyan ink, in which the hue angle $\angle H°$ is within the range of about 230° to about 260°, and the following ink (A) and the following ink (B):

ink (A): ink in which the hue angle $\angle H°$ is within the range of about 0° to about 80°; and, ink (B): ink in which the hue angle $\angle H°$ is within the range of about 0° to about 80°;

(wherein, the ink (A) has higher chroma and lower brightness than the magenta ink, the ink (B) has higher chroma and higher brightness than the magenta ink and has higher chroma and lower brightness than the yellow ink, the hue angle ($\angle H°$) is determined according to $\angle H° = \tan^{-1}(b*/a*)+180$ (when a*<0) or according to $\angle H° = \tan^{-1}(b*/a*)+360$ (when a*>0), and a* and b* represent a perceptive chromaticity index in the CIELAB color space).

A "recording medium" is preferably a recording medium ordinarily used in, for example, ink jet recording methods, and is particularly preferably PM Photo Paper (Seiko Epson Corp.).

The colorant of each ink is preferably a pigment ink.

As a result of employing such a composition, the present invention is able to satisfy granularity suppression, false contour suppression, prismatic light suppression, color reproducibility and gloss during recording. Namely, as a result of employing this composition, contrast of human skin color in recorded samples is improved while maintaining gloss.

In color reproduction of dark areas of human skin color, deterioration of granularity can be suppressed, occurrence of false contours can be suppressed, and prismatic light occurring in cases in which the pigment solid component concentration of an ink is low can be diminished.

In addition, in the case a*>0, color reproducibility in areas of high brightness, medium brightness and low brightness is further improved.

Although the ink (A) has higher chroma and lower brightness than the M ink, since the brightness of the Y ink is low, there is no deterioration of granularity. Moreover, since the chroma of the M ink is high and the chroma of the ink (B) is high, false contours can be suppressed, thereby enabling brightness of human skin color to be lowered with the same hue.

Since the ink (B) has higher chroma and higher brightness than the M ink and lower brightness than the Y ink, there is no deterioration of granularity even if the ink (B) is aggressively generated. Consequently, since the ink (B) can be used in place of the Y ink, the frequency at which the C ink dots and the Y ink dots are superimposed can be effectively reduced, thereby making it possible to suppress green transfer.

In addition, since the difference in the hue angle of the ink (B) is nearly 180 degrees relative to the C ink, there is no green transfer even if the C ink is generated, thereby making it possible to effectively reduce brightness.

The yellow ink preferably contains a complex pigment.

Examples of pigments contained in the yellow ink include C.I. pigment yellow (PY) 1, 2, 3, 12, 14, 16, 17, 73, 74, 75, 83, 93, 95, 97, 98, 109, 110, 114, 128, 129, 138, 139, 147, 150, 151, 154, 155, 180 and 185, and one or more types of these pigments are used.

The yellow ink particularly preferably contains C.I. pigment yellow 74 (PY74) and C.I. pigment yellow 129 (PY129) as pigments.

The cyan ink preferably contains a complex pigment.

Examples of pigments contained in the cyan ink include C.I. pigment blue (PB) 1, 2, 3, 15:3, 15:4, 15:34, 16, 22 and 60, C.I. vat blue 4 and 60, and C.I. pigment blue 76 (PB76), and one type of two or more types of these pigments are used.

The cyan ink particularly preferably contains C.I. pigment blue 15:4 (PB15:4) as pigment.

The cyan ink preferably further contains a white pigment. Examples of white pigments include oxides of elements belonging to group IV of the periodic table such as titanium dioxide and zirconia dioxide. As a result of the cyan ink containing a white pigment, red light of interference color is suppressed enabling suppression of prismatic light.

Examples of pigments contained in the magenta ink include C.I. pigment red (PR) 5, 7, 12, 48 (Ca), 48 (Mn), 57 (Ca), 57:1, 112, 122, 123, 168, 184, 202 and 209, and C.I. pigment violet 19 (PV19), and one or more types of these pigments are used.

The magenta pigment particularly preferably contains a solid solution of γ-type C.I. pigment violet 19 (PV19) and C.I. pigment red 202 (PR202) as pigment. The "solid solution of γ-type C.I. pigment violet 19 and C.I. pigment red 202" refers to a liquid crystal in a state in which γ-type PV19 and PR202 are mutually dissolved in a solid. Although the weight ratio of the solid solution of γ-type PV19 and PR202 can be suitably adjusted within the scope of the present invention, the weight of γ-type PV19 is preferably greater than the weight of PV202.

The results of X-ray powder diffraction analysis of a preferable example of the solid solution are shown in FIG. 1. In this analysis, samples were measured after packing into a glass cell having a thickness of 0.5 mm using PaNalytical X'PertPro.

The preferable magenta ink may also further contain other magenta pigments such as PV19 and PV32 in addition to the solid solution.

The ink (A) is preferably a red ink.

One or more types of pigments selected from the group consisting of C.I. pigment red (PR) 17, 49:2, 112, 149, 177, 178, 179, 188, 254, 255 and 264 are preferably used for the pigment contained in the ink (A).

The ink (A) is particularly preferably a red ink containing C.I. pigment red 177 (PR177) and/or C.I. pigment red 179 (PR179) as pigment.

The ink (B) is preferably an orange ink.

One or more types of pigments selected from the group consisting of C.I. pigment orange 5, 43, 36, 62 and 242 are preferably used for the pigment contained in the ink (B).

The ink (B) is particularly preferably an orange ink containing C.I. pigment orange 43 (POr43) and/or C.I. pigment red 242 (PR242) as pigment. In the case of containing C.I. pigment orange 43 (POr43) and C.I. pigment red 242 (PR242) as pigments, the ratio of the C.I. pigment orange 43 to the C.I. pigment red 242 is preferably 4:1 to 2:1 from the viewpoint of obtaining an ink provided with both light resistance and color development.

The ink set may be further provided with a blue ink containing C.I. pigment blue 76 (PB76), C.I. pigment blue 15:1 (PB15:1), nickel phthalocyanine and/or C.I. pigment violet 23 (PV23) as pigments.

The pigment solid component concentration in each of the inks is preferably less than 3% by weight.

The ink set may be further provided with a black ink, and the black ink may contain C.I. pigment black 7 as pigment.

In the case the ink set is provided with a black ink, the pigment solid component concentration of the black ink is preferably 1% by weight or less.

Examples of pigments contained in the black ink include inorganic pigments including carbon blacks (C.I. pigment 7) such as furnace black, lamp black, acetylene black and channel black, and iron oxide pigment, and organic pigments such as aniline black (C.I. pigment black 1). Carbon black is used particularly preferably, and preferable examples of carbon black include No. 2300, No. 900, MCF88, No. 33, No. 40, No. 52, MA7, MA8, MA100 and No. 2200B available from Mitsubishi Chemical Corp., Raven 5750, Raven 5250, Raven 5000, Raven 3500, Raven 1255 and Raven 700 available from Colombia Inc., Regal 400R, Regal 1660R, Mogul 1, Monarch 700, Monarch 800, Monarch 880, Monarch 900, Monarch 1000, Monarch 1100, Monarch 1300 and Monarch 1400 available from Cabot Corp., and Color Black FW1, Color Black FW2, Color Black FW2V, Color Black FW18, Color Black FW200, Color Black S150, Color Black S160, Color Black S170, Printex 35, Printex U, Printex V, Printex 140U, Specil Black 6, Specil Black 5, Specil Black 4A and Specil Black 4 available from Degussa AG.

The ink set may further be provided with a clear ink not containing a colorant. As a result of being provided with a clear ink, recorded images are obtained having superior gloss, color development, rub resistance and storage stability.

Each ink preferably contains a dispersant for enhancing dispersion stability of the pigment. Preferable examples of dispersants include cationic dispersants, anionic dispersants, nonionic dispersants and surfactants.

Examples of anionic dispersants include polyacrylic acid, polymethacrylic acid, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methyl styrene-acrylic acid copolymers, styrene-α-methyl styrene-acrylic acid-acrylic acid alkyl ester copolymers, styrene-maleic acid copolymers, vinylnapthalene-maleic acid copolymers, vinyl acetate-ethylene copolymers, vinyl acetate-fatty acid vinyl ethylene copolymers, vinyl acetate-maleic acid ester copolymers, vinyl acetate-crotonic acid copolymers and vinyl acetate-acrylic acid copolymers.

Examples of nonionic dispersants include polyvinyl pyrrolidone, polypropylene glycol and vinyl pyrrolidone-vinyl acetate copolymers.

Examples of dispersants in the form surfactants include anionic surfactants such as sodium dodecylbenzene sulfonate, sodium laurate and ammonium salts of polyoxyethylene alkyl ether sulfates, and nonionic surfactants such as polyoxyethylene alkyl ethers, polyoxyethylene alkyl esters, polyoxyethylene sorbitan fatty acid esters, polyoxyethylene alkyl phenyl ethers, polyoxyethylene alkyl amines and polyoxyethylene alkyl amides. Styrene-(meth)acrylic acid copolymers are used particularly preferably from the viewpoint of enhancing dispersion stability of the pigment.

The dispersant is preferably contained at 0.1 to 10% by weight, and more preferably at 0.3 to 6% by weight, as the amount of solid in each ink.

Each ink preferably contains 3 to 15% by weight of an optionally branched alkanediol having 5 to 10 carbon atoms, and particularly preferably contains 8 to 15% by weight of a water-soluble 1,2-alkanediol. Alternatively, each ink preferably contains 3 to 8% by weight of an alkanediol having water-soluble terminals. 4-methyl-1,2-pentanediol, 1,2-pentanediol, 3,3-dimethyl-1,2-butanediol, 4,4-dimethyl-1,2-pentanediol, 5-methyl-1,2-hexanediol, 1,2-hexanediol, 1,2-heptanediol and 1,2-octanediol are preferable, while 4-methyl-1,2-pentanediol and 1,2-hexanediol are more preferable.

Each ink preferably contains one or more types of polyvalent alcohols, sugars or polyvalent alcohols having an ethylene oxide chain as a wetting agent. As a result of adding such a wetting agent, drying of the ink is prevented and clogging of the head of an ink jet printer is suppressed in the case of using for ink jet recording.

Examples of wetting agents include polyvalent alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylol ethane or trimethylol propane; sugars such as sugar alcohols; and polyvalent alcohols having an ethylene oxide chain such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether or triethylene glycol monobutyl ether, and one or more types of these wetting agents are used.

The wetting agent is preferably contained at 3 to 16% by weight as the amount of solid in each ink.

Each ink may contain one or more types of lactones, lactams (pyrrolidones), alkanediols or glycol ethers as a penetrating agent. As a result of adding a penetrating agent, the wettability to the recording medium can be enhanced and the penetrability of the ink can be improved.

Examples of penetrating agents include lactones such as γ-butyrolactone; lactams (pyrrolidones) such as 2-pyrrolidone or N-methyl-2-pyrrolidone; alkanediols such as 1,2-pentanediol, 4-methyl-1,2-pentanediol or 1,2-hexanediol; and glycol ethers such as ethylene glycol monomethyl ether, diethylene glycol monoethyl ether, diethylene glycol monobutyl ether, triethylene glycol monobutyl ether, propylene glycol monobutyl ether or dipropylene glycol monobutyl ether.

The penetrating agent is preferably contained at 8 to 15% by weight as the amount of solid in each ink.

Each ink may also contain one or more types of a surfactant in the form of an acetylene glycol or polysiloxane. As a result of adding a surfactant, wettability to the recording medium can be enhanced and ink penetrability can be improved.

Each ink preferably contains a surfactant in the form of a polyorganosiloxane.

In the case a magenta ink composition of the present invention contains a polyorganosiloxane, one type of polyorganosiloxane may be contained or two or more types of polyorganosiloxane may be contained.

Each ink preferably contains a polyorganosiloxane represented by the following general formula:

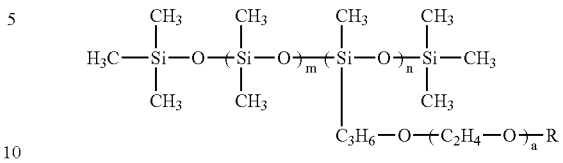

(wherein, R represents a hydrogen atom or a methyl group, a represents an integer of 7 to 11, m represents an integer of 20 to 70, and n represents an integer of 2 to 5).

As a result of employing such a preferable composition, a recorded article can be obtained having further improved gloss.

Alternatively, each ink preferably contains a polyorganosiloxane represented by the following general formula in addition to the polyorganosiloxane represented by the general formula indicated above:

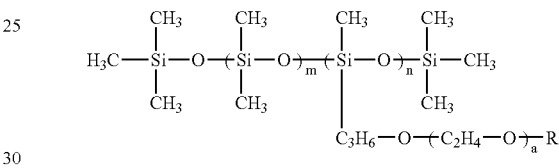

(wherein, R represents a hydrogen atom or a methyl group, a represents an integer of 9 to 13, m represents an integer of 2 to 4, and n represents an integer of 1 to 2).

As a result of employing such a preferable composition, uneven aggregation when recording onto printing proof paper can be suppressed.

Each ink may contain a low boiling point organic solvent from the viewpoint of shortening ink drying time. Examples of these low boiling point organic solvents include methanol, ethanol, n-propyl alcohol, isopropyl alcohol, n-butanol, sec-butanol, tert-butanol, iso-butanol and n-pentanol, and one or more types are used. Monovalent alcohols are particularly preferable.

Each ink preferably contains a component such as any of the pigments, dispersants, wetting agents, low boiling point organic solvents, penetrating agents and surfactants previously described, and contains water for the balance thereof. Pure water of ultrapure water such as ion exchange water, ultrafiltered water, reverse osmosis water or distilled water is preferably used for the water. In particular, water obtained by sterilizing this water by ultraviolet irradiation or addition of hydrogen peroxide and the like is preferable since mold and bacteria growth are prevented over a long period of time.

Each ink can contain additives including fixing agents such as a water-soluble rosin, anti-mold agents or antiseptics such as sodium benzoate, antioxidants or ultraviolet absorbers such as alohanates, chelating agents, oxygen absorbers and pH adjusters as necessary, and one or more types are used.

Examples of pH adjusters include potassium hydroxide, sodium hydroxide, triethanolamine and tripropanolamine. The amount of pH adjuster added is determined according to the target pH.

The ink set of the present invention is preferably used in an ink jet recording method in the form of a recording method in which ink droplets are discharged from a nozzle and the ink droplets are adhered to a recording medium to form images such as characters and graphics, and particularly preferably used in an on-demand type of ink jet recording method. Examples of on-demand type ink jet recording methods include a piezoelectric device recording method in which recording is carried out using a piezoelectric device arranged on a printer head, and a thermal jet recording method in which recording is carried out using thermal energy generated by, for example, a heater of an exothermic resistor element arranged on a printer head, and any of these ink jet recording methods can be used preferably.

EXAMPLES

Although the following provides a more detailed explanation of the present invention through examples thereof, the present invention is not limited to these examples. A person with ordinary skill in the art is able to carry out the following examples as well as adding various alterations thereto, and these variations are also included within the scope of the present invention.

Example 1

A magenta ink composition containing a solid solution of γ-type PV19 and PR202 (to be referred to as the solid solution), in which the weight of the γ-type PV19 is greater than the weight of the PR202, was prepared according to the formula indicated below for the magenta ink. In addition, yellow ink, cyan ink, red ink, orange ink and black ink were respectively prepared according to the following formulas to obtain an ink set.

Magenta Ink Composition: Example 1

Solid solution
2.2 wt %
Styrene-acrylic acid copolymer resin
0.8 wt %
Glycerin
10.0 wt %
4-methyl-1,2-pentanediol
8.0 wt %
Triethanolamine
0.9 wt %
BYKUV3510 (Bic Chemi Japan, Ltd.)
0.1 wt %
Pure water
Balance
Total
100.0 wt %

Yellow Ink Composition: Example 1

PY74
1.5 wt %
PY129
0.5 wt %
Styrene-acrylic acid copolymer resin
0.8 wt %
Glycerin
10.0 wt %
4-methyl-1,2-pentanediol
8.0 wt %
Triethanolamine
0.9 wt %
BYKUV3510 (Bic Chemi Japan, Ltd.)
0.1 wt %
Pure water
Balance
Total
100.0 wt %

Cyan Ink Composition: Example 1

PB15:4
1.5 wt %
Titanium dioxide
0.5 wt %
Styrene-acrylic acid copolymer resin
0.8 wt %
Glycerin
10.0 wt %
4-methyl-1,2-pentanediol
8.0 wt %
Triethanolamine
0.9 wt %
BYKUV3510 (Bic Chemi Japan, Ltd.)
0.1 wt %
Pure water
Balance
Total
100.0 wt %

Red Ink Composition: Example 1

PR177
2.5 wt %
Styrene-acrylic acid copolymer resin
1.0 wt %
Glycerin
10.0 wt %
4-methyl-1,2-pentanediol
8.0 wt %
Triethanolamine
0.9 wt %
BYKUV3510 (Bic Chemi Japan, Ltd.)
0.1 wt %
Pure water
Balance
Total
100.0 wt %

Orange Ink Composition: Example 1

POr43
2.0 wt %
Styrene-acrylic acid copolymer resin
0.8 wt %
Glycerin
10.0 wt %
4-methyl-1,2-pentanediol
8.0 wt %
Triethanolamine
0.9 wt %
BYKUV3510 (Bic Chemi Japan, Ltd.)
0.1 wt %
Pure water
Balance
Total
100.0 wt %

Black Ink Composition: Example 1

PCB7
1.5 wt %
PB15:4
0.2 wt %
Styrene-acrylic acid copolymer resin
0.8 wt %
Glycerin
10.0 wt %
4-methyl-1,2-pentanediol
8.0 wt %
Triethanolamine
0.9 wt %
BYKUV3510 (Bic Chemi Japan, Ltd.)
0.1 wt %
Pure water
Balance
Total
100.0 wt %

Comparative Example 1

Magenta ink, yellow ink, cyan ink and blue ink compositions were respectively prepared according to the formulas indicated below followed by providing red ink and black ink having the same compositions as Example 1 to obtain the ink set of Comparative Example 1.

Magenta Ink Composition—Comparative Example 1

PV19
2.0 wt %
Styrene-acrylic acid copolymer resin
0.8 wt %
Glycerin
10.0 wt %
4-methyl-1,2-pentanediol
8.0 wt %
Triethanolamine
0.9 wt %
BYKUV3510 (Bic Chemi Japan, Ltd.)
0.1 wt %
Pure water
Balance
Total
100.0 wt %, Yellow Ink Composition: Comparative Example 1

PY74
3.0 wt %
Styrene-acrylic acid copolymer resin
1.2 wt %
Glycerin
10.0 wt %
4-methyl-1,2-pentanediol
8.0 wt %
Triethanolamine
0.9 wt %
BYKUV3510 (Bic Chemi Japan, Ltd.)
0.1 wt %
Pure water
Balance
Total
100.0 wt %

Cyan Ink Composition: Comparative Example 1

PB15:4
1.5 wt %
Styrene-acrylic acid copolymer resin
0.8 wt %
Glycerin
10.0 wt %
4-methyl-1,2-pentanediol
8.0 wt %
Triethanolamine
0.9 wt %
BYKUV3510 (Bic Chemi Japan, Ltd.)
0.1 wt %
Pure water
Balance
Total
100.0 wt %

Blue Ink Composition: Comparative Example 1

PV23
1.5 wt %
Styrene-acrylic acid copolymer resin
0.8 wt %
Glycerin
10.0 wt %
1,2-hexanediol
8.0 wt %
1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Each of the ink compositions prepared in the manner described above was installed in an ink cartridge of an ink jet printer (product name: "MC-2000", Seiko Epson Corp.), and recording was carried out on Photo Paper <Gloss> (Seiko Epson Corp.) at a resolution of 1440×1440 dpi while varying the duty (%). The L* value, a* value and b* value were measured for each recorded article.

Duty is defined as (actual number of printed dots)/ (vertical resolution× horizontal resolution)×100 (%).

Measurement of L*, a*, b* and C* values was carried out using the Gretag Macbeth SPM50 spectrophotometer (Gretag-Macbeth AG). More specifically, measurements were carried out using a D50 light source without a light source filter, using absolute white for the white standard, and using a view angle of 2°.

h (hue angle (°)) was determined according to $\angle H° = \tan^{-1}(b*/a*)+180$ (when a*<0) or according to $\angle H° = \tan^{-1}(b*/a*)+360$ when a*>0).

The results for the ink set of Example 1 are shown in Tables 1 and 2.

TABLE 1

| | Duty | L* | a* | b* | C* | h |
|---|---|---|---|---|---|---|
| Y | 255 | 83.3 | −2.9 | 106.4 | 106.4 | 91.6 |
| | 230 | 83.6 | −4.9 | 105.4 | 105.5 | 92.7 |
| | 205 | 84.1 | −4.6 | 105.1 | 105.2 | 92.5 |

TABLE 1-continued

|   | Duty | L* | a* | b* | C* | h |
|---|------|------|------|------|------|------|
|   | 180 | 85.4 | −6.7 | 104.9 | 105.1 | 93.6 |
|   | 155 | 85.2 | −8.3 | 100.8 | 101.1 | 94.7 |
|   | 130 | 87.2 | −7.7 | 97.6 | 97.9 | 94.5 |
|   | 105 | 88.0 | −11.5 | 85.3 | 86.1 | 97.7 |
|   | 80 | 87.7 | −11.1 | 66.5 | 67.4 | 99.5 |
|   | 55 | 89.3 | −8.4 | 44.5 | 45.3 | 100.7 |
|   | 30 | 91.7 | −5.5 | 22.9 | 23.6 | 103.5 |
|   | 15 | 93.1 | −3.2 | 10.0 | 10.5 | 107.9 |
| M | 255 | 51.6 | 82.6 | −14.8 | 83.9 | 350.0 |
|   | 230 | 52.6 | 82.1 | −17.1 | 83.8 | 348.3 |
|   | 205 | 54.5 | 81.0 | −19.1 | 83.2 | 346.7 |
|   | 180 | 56.0 | 77.6 | −23.5 | 81.1 | 343.2 |
|   | 155 | 58.4 | 73.4 | −24.7 | 77.5 | 341.4 |
|   | 130 | 63.5 | 66.2 | −24.1 | 70.4 | 340.0 |
|   | 105 | 67.8 | 54.8 | −24.8 | 60.2 | 335.6 |
|   | 80 | 72.2 | 42.8 | −22.3 | 48.3 | 332.5 |
|   | 55 | 78.7 | 29.6 | −16.7 | 34.0 | 330.6 |
|   | 30 | 85.6 | 16.8 | −10.9 | 20.0 | 326.9 |
|   | 15 | 90.0 | 8.6 | −7.4 | 11.4 | 319.2 |
| C | 255 | 48.6 | −34.8 | −60.9 | 70.1 | 240.3 |
|   | 230 | 49.9 | −36.8 | −59.8 | 70.2 | 238.4 |
|   | 205 | 52.4 | −40.1 | −57.7 | 70.3 | 235.2 |
|   | 180 | 55.4 | −43.3 | −54.8 | 69.9 | 231.7 |
|   | 155 | 58.5 | −43.1 | −51.8 | 67.3 | 230.2 |
|   | 130 | 63.6 | −44.6 | −44.6 | 63.1 | 225.0 |
|   | 105 | 68.5 | −38.8 | −39.8 | 55.5 | 225.7 |
|   | 80 | 73.0 | −30.8 | −33.1 | 45.2 | 227.1 |
|   | 55 | 79.2 | −21.6 | −24.8 | 32.9 | 228.9 |
|   | 30 | 85.8 | −12.4 | −16.0 | 20.2 | 232.3 |
|   | 15 | 90.0 | −6.5 | −10.1 | 12.0 | 237.4 |

TABLE 2

|   | Duty | L* | a* | b* | C* | h |
|---|------|------|------|------|------|------|
| R | 255 | 41.7 | 77.9 | 44.7 | 89.8 | 29.8 |
|   | 230 | 42.8 | 77.7 | 38.2 | 86.5 | 26.2 |
|   | 205 | 44.5 | 77.0 | 30.3 | 82.8 | 21.5 |
|   | 180 | 46.8 | 74.7 | 21.1 | 77.6 | 15.8 |
|   | 155 | 50.5 | 69.9 | 12.1 | 70.9 | 9.8 |
|   | 130 | 55.5 | 61.7 | 4.6 | 61.9 | 4.3 |
|   | 105 | 62.7 | 50.5 | −0.1 | 50.5 | 359.9 |
|   | 80 | 70.1 | 36.7 | −4.0 | 37.0 | 353.8 |
|   | 55 | 78.1 | 23.9 | −4.9 | 24.3 | 348.5 |
|   | 30 | 85.6 | 13.2 | −4.8 | 14.0 | 340.0 |
|   | 15 | 90.3 | 6.6 | −4.4 | 7.9 | 326.0 |
| Or | 255 | 59.2 | 65.4 | 93.6 | 114.1 | 55.1 |
|   | 230 | 59.9 | 64.2 | 93.3 | 113.3 | 55.5 |
|   | 205 | 61.3 | 62.5 | 91.7 | 111.0 | 55.7 |
|   | 180 | 62.8 | 59.2 | 87.2 | 105.4 | 55.8 |
|   | 155 | 64.3 | 56.4 | 78.3 | 96.5 | 54.2 |
|   | 130 | 68.1 | 51.6 | 66.8 | 84.4 | 52.3 |
|   | 105 | 71.4 | 43.2 | 51.5 | 67.2 | 50.1 |
|   | 80 | 74.8 | 34.3 | 36.4 | 50.0 | 46.7 |
|   | 55 | 80.3 | 24.2 | 22.0 | 32.7 | 42.3 |
|   | 30 | 86.4 | 13.8 | 10.1 | 17.0 | 36.2 |
|   | 15 | 90.4 | 6.9 | 3.2 | 7.6 | 25.0 |
| K | 255 | 2.7 | −0.2 | −0.3 | 0.3 | 234.2 |
|   | 230 | 3.4 | −0.2 | 0.3 | 0.3 | 116.6 |
|   | 205 | 5.0 | −0.2 | 1.8 | 1.8 | 97.2 |
|   | 180 | 10.1 | −0.3 | 5.3 | 5.3 | 93.4 |
|   | 155 | 18.8 | −0.7 | 7.0 | 7.0 | 95.6 |
|   | 130 | 29.3 | −0.5 | 8.1 | 8.1 | 93.5 |
|   | 105 | 41.4 | −0.9 | 7.7 | 7.7 | 96.5 |
|   | 80 | 53.1 | −1.1 | 5.3 | 5.4 | 101.9 |
|   | 55 | 66.6 | −0.9 | 2.4 | 2.6 | 109.5 |
|   | 30 | 78.8 | −0.5 | 0.1 | 0.5 | 174.1 |
|   | 15 | 86.3 | −0.2 | −1.4 | 1.4 | 261.1 |

The results for the ink set of Comparative Example 1 are shown in Tables 3 and 4.

TABLE 3

|   | Duty | L* | a* | b* | C* | h |
|---|------|------|------|------|------|------|
| Y | 255 | 88.2 | −1.3 | 108.9 | 108.9 | 90.7 |
|   | 230 | 88.5 | −2.1 | 108.6 | 108.6 | 91.1 |
|   | 205 | 88.7 | −3.1 | 108.3 | 108.4 | 91.6 |
|   | 180 | 88.9 | −4.3 | 107.7 | 107.8 | 92.3 |
|   | 155 | 89.2 | −6.0 | 106.6 | 106.7 | 93.2 |
|   | 130 | 89.7 | −7.3 | 104.7 | 105.0 | 94.0 |
|   | 105 | 90.0 | −9.2 | 99.5 | 100.0 | 95.3 |
|   | 80 | 91.1 | −9.9 | 87.9 | 88.4 | 96.4 |
|   | 55 | 92.0 | −10.6 | 63.8 | 64.7 | 99.4 |
|   | 30 | 93.3 | −8.2 | 35.2 | 36.1 | 103.2 |
|   | 15 | 94.0 | −5.0 | 15.8 | 16.6 | 107.5 |
| M | 255 | 52.5 | 80.6 | 1.7 | 80.6 | 1.2 |
|   | 230 | 53.6 | 79.8 | −1.6 | 79.8 | 358.9 |
|   | 205 | 55.2 | 77.7 | −6.4 | 78.0 | 355.3 |
|   | 180 | 58.2 | 74.4 | −10.0 | 75.0 | 352.3 |
|   | 155 | 61.0 | 68.1 | −14.1 | 69.6 | 348.3 |
|   | 130 | 66.2 | 59.6 | −14.0 | 61.2 | 346.8 |
|   | 105 | 71.4 | 47.7 | −15.1 | 50.0 | 342.5 |
|   | 80 | 76.1 | 36.0 | −14.2 | 38.7 | 338.5 |
|   | 55 | 82.2 | 24.5 | −11.0 | 26.8 | 335.7 |
|   | 30 | 87.8 | 14.0 | −7.8 | 16.0 | 330.7 |
|   | 15 | 91.7 | 6.9 | −6.0 | 9.2 | 319.1 |
| C | 255 | 48.8 | −32.6 | −65.4 | 73.1 | 243.5 |
|   | 230 | 50.6 | −35.6 | −63.8 | 73.1 | 240.8 |
|   | 205 | 53.2 | −39.5 | −61.4 | 73.0 | 237.2 |
|   | 180 | 56.1 | −41.9 | −58.6 | 72.0 | 234.4 |
|   | 155 | 60.4 | −45.6 | −52.2 | 69.3 | 228.9 |
|   | 130 | 65.1 | −43.4 | −47.5 | 64.3 | 227.6 |
|   | 105 | 69.3 | −37.3 | −41.2 | 55.6 | 227.8 |
|   | 80 | 74.5 | −30.0 | −33.6 | 45.0 | 228.2 |
|   | 55 | 81.1 | −21.0 | −24.8 | 32.5 | 229.7 |
|   | 30 | 87.3 | −12.3 | −15.9 | 20.1 | 232.3 |
|   | 15 | 91.2 | −6.6 | −10.0 | 12.0 | 236.8 |

TABLE 4

|   | Duty | L* | a* | b* | C* | h |
|---|------|------|------|------|------|------|
| R | 255 | 41.7 | 77.9 | 44.7 | 89.8 | 29.8 |
|   | 230 | 42.8 | 77.7 | 38.2 | 86.5 | 26.2 |
|   | 205 | 44.5 | 77.0 | 30.3 | 82.8 | 21.5 |
|   | 180 | 46.8 | 74.7 | 21.1 | 77.6 | 15.8 |
|   | 155 | 50.5 | 69.9 | 12.1 | 70.9 | 9.8 |
|   | 130 | 55.5 | 61.7 | 4.6 | 61.9 | 4.3 |
|   | 105 | 62.7 | 50.5 | −0.1 | 50.5 | 359.9 |
|   | 80 | 70.1 | 36.7 | −4.0 | 37.0 | 353.8 |
|   | 55 | 78.1 | 23.9 | −4.9 | 24.3 | 348.5 |
|   | 30 | 85.6 | 13.2 | −4.8 | 14.0 | 340.0 |
|   | 15 | 90.3 | 6.6 | −4.4 | 7.9 | 326.0 |
| V | 255 | 14.2 | 35.3 | −46.0 | 58.0 | 307.5 |
|   | 230 | 14.9 | 41.6 | −53.0 | 67.4 | 308.1 |
|   | 205 | 16.0 | 47.8 | −59.7 | 76.5 | 308.6 |
|   | 180 | 18.4 | 53.4 | −65.6 | 84.6 | 309.1 |
|   | 155 | 22.2 | 57.1 | −69.7 | 90.1 | 309.4 |
|   | 130 | 28.4 | 57.6 | −69.8 | 90.5 | 309.5 |
|   | 105 | 38.3 | 52.3 | −63.8 | 82.5 | 309.3 |
|   | 80 | 50.4 | 41.7 | −52.6 | 67.1 | 308.4 |
|   | 55 | 64.5 | 28.1 | −37.8 | 47.1 | 306.7 |
|   | 30 | 77.9 | 15.6 | −23.4 | 28.2 | 303.7 |
|   | 15 | 86.5 | 7.7 | −14.0 | 16.0 | 298.7 |
| K | 255 | 2.7 | −0.2 | −0.3 | 0.3 | 234.2 |
|   | 230 | 3.4 | −0.2 | 0.3 | 0.3 | 116.6 |
|   | 205 | 5.0 | −0.2 | 1.8 | 1.8 | 97.2 |
|   | 180 | 10.1 | −0.3 | 5.3 | 5.3 | 93.4 |
|   | 155 | 18.8 | −0.7 | 7.0 | 7.0 | 95.6 |
|   | 130 | 29.3 | −0.5 | 8.1 | 8.1 | 93.5 |
|   | 105 | 41.4 | −0.9 | 7.7 | 7.7 | 96.5 |
|   | 80 | 53.1 | −1.1 | 5.3 | 5.4 | 101.9 |
|   | 55 | 66.6 | −0.9 | 2.4 | 2.6 | 109.5 |
|   | 30 | 78.8 | −0.5 | 0.1 | 0.5 | 174.1 |
|   | 15 | 86.3 | −0.2 | −1.4 | 1.4 | 261.1 |

Example 2

A magenta ink composition containing a solid solution of γ-type PV19 and PR202 (to be referred to as the solid solution), in which the weight of the γ-type PV19 is greater than the weight of the PR202, was prepared according to the formula indicated below for the magenta ink. In addition, yellow ink, cyan ink, red ink, orange ink and black ink were respectively prepared according to the following formulas to obtain an ink set.

Magenta Ink Composition: Example 2

Solid solution
2.2 wt %
Styrene-acrylic acid copolymer resin
0.8 wt %
Glycerin
10.0 wt %
1,2-hexanediol
8.0 wt %
1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Yellow Ink Composition: Example 2

PY74
1.5 wt %
PY129
0.5 wt %
Styrene-acrylic acid copolymer resin
0.8 wt %
Glycerin
10.0 wt %
1,2-hexanediol
8.0 wt %
1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Cyan Ink Composition: Example 2

PB15:4
1.5 wt %
Titanium dioxide
0.5 wt %
Styrene-acrylic acid copolymer resin
0.8 wt %
Glycerin
10.0 wt %
1,2-hexanediol
8.0 wt %

1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Red Ink Composition: Example 2

PR117
2.5 wt %
Styrene-acrylic acid copolymer resin
1.0 wt %
Glycerin
10.0 wt %
1,2-hexanediol
8.0 wt %
1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Orange Ink Composition: Example 2

POr43
1.5 wt %
POr242
0.5 wt %
Styrene-acrylic acid copolymer resin
0.8 wt %
Glycerin
10.0 wt %
1,2-hexanediol
8.0 wt %
1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Black Ink Composition: Example 2

PCB7
1.5 wt %
PB15:4
0.2 wt %
Styrene-acrylic acid copolymer resin
0.8 wt %
Glycerin
10.0 wt %
1,2-hexanediol
8.0 wt %

1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Comparative Example 2

Magenta ink, yellow ink, cyan ink and blue ink compositions were respectively prepared according to the formulas indicated below followed by providing red ink and black ink having the same compositions as Example 2 to obtain the ink set of Comparative Example 2.

Magenta Ink Composition—Comparative Example 2

PV19
2.0 wt %
Styrene-acrylic acid copolymer resin
0.8 wt %
Glycerin
10.0 wt %
1,2-hexanediol
8.0 wt %
1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Yellow Ink Composition: Comparative Example 2

PY74
3.0 wt %
Styrene-acrylic acid copolymer resin
1.2 wt %
Glycerin
10.0 wt %
1,2-hexanediol
8.0 wt %
1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Cyan Ink Composition: Comparative Example 2

PB15:4
1.5 wt %
Styrene-acrylic acid copolymer resin
0.8 wt %
Glycerin
10.0 wt %
1,2-hexanediol
8.0 wt %
1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Blue Ink Composition: Comparative Example 2

PV23
1.5 wt %
Styrene-acrylic acid copolymer resin
0.8 wt %
Glycerin
10.0 wt %
1,2-hexanediol
8.0 wt %
1,5-pentanediol
3.0 wt %
Triethanolamine
0.9 wt %
BYKUV3510 (Bic Chemi Japan, Ltd.)
0.1 wt %
Pure water
Balance
Total
100.0 wt %

Each of the ink compositions prepared in the manner described above was installed in an ink cartridge of an ink jet printer (product name: "MC-2000", Seiko Epson Corp.), and recording was carried out on Photo Paper <Gloss> (Seiko Epson Corp.) at a resolution of 1440×1440 dpi while varying the duty (%). The L* value, a* value and b* value were measured for each recorded article.

Duty is defined as (actual number of printed dots)/ vertical resolution×horizontal resolution)×100 (%).

Measurement of L*, a*, b* and C* values was carried out using the Gretag Macbeth SPM50 spectrophotometer (Gretag-Macbeth AG). More specifically, measurements were carried out using a D50 light source without a light source filter, using absolute white for the white standard, and using a view angle of 2°.

h (hue angle (°)) was determined according to ∠H°=tan$^{-1}$ (b*/a*)+180 (when a*<0) or according to ∠H°=tan$^{-1}$ (b*/a*)+360 (when a*>0).

The results for the ink set of Example 2 are shown in Tables 5 and 6.

TABLE 5

| | Duty | L* | a* | b* | C* | h |
|---|---|---|---|---|---|---|
| Y | 255 | 83.3 | −2.9 | 106.4 | 106.4 | 91.6 |
| | 230 | 83.6 | −4.9 | 105.4 | 105.5 | 92.7 |
| | 205 | 84.1 | −4.6 | 105.1 | 105.2 | 92.5 |
| | 180 | 85.4 | −6.7 | 104.9 | 105.1 | 93.6 |
| | 155 | 85.2 | −8.3 | 100.8 | 101.1 | 94.7 |
| | 130 | 87.2 | −7.7 | 97.6 | 97.9 | 94.5 |
| | 105 | 88.0 | −11.5 | 85.3 | 86.1 | 97.7 |
| | 80 | 87.7 | −11.1 | 66.5 | 67.4 | 99.5 |

TABLE 5-continued

|   | Duty | L* | a* | b* | C* | h |
|---|---|---|---|---|---|---|
|   | 55 | 89.3 | -8.4 | 44.5 | 45.3 | 100.7 |
|   | 30 | 91.7 | -5.5 | 22.9 | 23.6 | 103.5 |
|   | 15 | 93.1 | -3.2 | 10.0 | 10.5 | 107.9 |
| M | 255 | 51.6 | 82.6 | -14.6 | 83.9 | 350.0 |
|   | 230 | 52.6 | 82.1 | -17.1 | 83.8 | 348.3 |
|   | 205 | 54.5 | 81.0 | -19.1 | 83.2 | 346.7 |
|   | 180 | 56.0 | 77.6 | -23.5 | 81.1 | 343.2 |
|   | 155 | 58.4 | 73.4 | -24.7 | 77.5 | 341.4 |
|   | 130 | 63.5 | 66.2 | -24.1 | 70.4 | 340.0 |
|   | 105 | 67.8 | 54.8 | -24.8 | 60.2 | 335.6 |
|   | 80 | 72.2 | 42.8 | -22.3 | 48.3 | 332.5 |
|   | 55 | 78.7 | 29.6 | -16.7 | 34.0 | 330.6 |
|   | 30 | 85.6 | 16.8 | -10.9 | 20.0 | 326.9 |
|   | 15 | 90.0 | 8.6 | -7.4 | 11.4 | 319.2 |
| C | 255 | 48.6 | -34.8 | -60.9 | 70.1 | 240.3 |
|   | 230 | 49.9 | -36.8 | -59.8 | 70.2 | 238.4 |
|   | 205 | 52.4 | -40.1 | -57.7 | 70.3 | 235.2 |
|   | 180 | 55.4 | -43.3 | -54.8 | 69.9 | 231.7 |
|   | 155 | 58.5 | -43.1 | -51.8 | 67.3 | 230.2 |
|   | 130 | 63.6 | -44.6 | -44.6 | 63.1 | 225.0 |
|   | 105 | 68.5 | -38.8 | -39.8 | 55.5 | 225.7 |
|   | 80 | 73.0 | -30.8 | -33.1 | 45.2 | 227.1 |
|   | 55 | 79.2 | -21.6 | -24.8 | 32.9 | 228.9 |
|   | 30 | 85.8 | -12.4 | -16.0 | 20.2 | 232.3 |
|   | 15 | 90.0 | -6.5 | -10.1 | 12.0 | 237.4 |

TABLE 6

|   | Duty | L* | a* | b* | C* | h |
|---|---|---|---|---|---|---|
| R | 255 | 41.7 | 77.9 | 44.7 | 89.8 | 29.8 |
|   | 230 | 42.8 | 77.7 | 38.2 | 86.5 | 26.2 |
|   | 205 | 44.5 | 77.0 | 30.3 | 82.8 | 21.5 |
|   | 180 | 46.8 | 74.7 | 21.1 | 77.6 | 15.8 |
|   | 155 | 50.5 | 69.9 | 12.1 | 70.9 | 9.8 |
|   | 130 | 55.5 | 61.7 | 4.6 | 61.9 | 4.3 |
|   | 105 | 62.7 | 50.5 | -0.1 | 50.5 | 359.9 |
|   | 80 | 70.1 | 36.7 | -4.0 | 37.0 | 353.8 |
|   | 55 | 78.1 | 23.9 | -4.9 | 24.3 | 348.5 |
|   | 30 | 85.6 | 13.2 | -4.8 | 14.0 | 340.0 |
|   | 15 | 90.3 | 6.6 | -4.4 | 7.9 | 326.0 |
| Or | 255 | 61.8 | 61.6 | 92.6 | 111.2 | 56.3 |
|   | 230 | 62.0 | 60.5 | 92.4 | 110.5 | 56.8 |
|   | 205 | 62.7 | 59.6 | 90.2 | 108.1 | 56.6 |
|   | 180 | 63.5 | 59.0 | 89.2 | 106.9 | 56.5 |
|   | 155 | 64.4 | 56.2 | 83.2 | 100.4 | 55.9 |
|   | 130 | 65.3 | 54.0 | 76.2 | 93.4 | 54.7 |
|   | 105 | 67.3 | 51.4 | 65.6 | 83.3 | 51.9 |
|   | 80 | 70.8 | 44.6 | 48.5 | 66.7 | 48.0 |
|   | 55 | 74.2 | 36.1 | 35.9 | 50.9 | 44.9 |
|   | 30 | 80.1 | 23.5 | 18.6 | 30.0 | 38.3 |
|   | 15 | 86.0 | 13.2 | 8.1 | 15.4 | 31.6 |
| K | 255 | 2.7 | -0.2 | -0.3 | 0.3 | 234.2 |
|   | 230 | 3.4 | -0.2 | 0.3 | 0.3 | 116.6 |
|   | 205 | 5.0 | -0.2 | 1.8 | 1.8 | 97.2 |
|   | 180 | 10.1 | -0.3 | 5.3 | 5.3 | 93.4 |
|   | 155 | 18.8 | -0.7 | 7.0 | 7.0 | 95.6 |
|   | 130 | 29.3 | -0.5 | 8.1 | 8.1 | 93.5 |
|   | 105 | 41.4 | -0.9 | 7.7 | 7.7 | 96.5 |
|   | 80 | 53.1 | -1.1 | 5.3 | 5.4 | 101.9 |
|   | 55 | 66.6 | -0.9 | 2.4 | 2.6 | 108.5 |
|   | 30 | 78.8 | -0.5 | 0.1 | 0.5 | 174.1 |
|   | 15 | 86.3 | -0.2 | -1.4 | 1.4 | 281.1 |

The results for the ink set of Comparative Example 2 are shown in Tables 7 and 8.

TABLE 7

|   | Duty | L* | a* | b* | C* | h |
|---|---|---|---|---|---|---|
| Y | 255 | 88.2 | -1.3 | 108.9 | 108.9 | 90.7 |
|   | 230 | 88.5 | -2.1 | 108.6 | 108.6 | 91.1 |

TABLE 7-continued

|   | Duty | L* | a* | b* | C* | h |
|---|---|---|---|---|---|---|
|   | 205 | 88.7 | -3.1 | 108.3 | 108.4 | 91.6 |
|   | 180 | 88.9 | -4.3 | 107.7 | 107.8 | 92.3 |
|   | 155 | 89.2 | -6.0 | 106.6 | 106.7 | 93.2 |
|   | 130 | 89.7 | -7.3 | 104.7 | 105.0 | 94.0 |
|   | 105 | 90.0 | -9.2 | 99.5 | 100.0 | 95.3 |
|   | 80 | 91.1 | -9.9 | 87.9 | 88.4 | 96.4 |
|   | 55 | 92.0 | -10.6 | 63.8 | 64.7 | 99.4 |
|   | 30 | 93.3 | -8.2 | 35.2 | 36.1 | 103.2 |
|   | 15 | 94.0 | -5.0 | 15.8 | 16.6 | 107.5 |
| M | 255 | 52.5 | 90.6 | 1.7 | 80.6 | 1.2 |
|   | 230 | 53.6 | 79.8 | -1.6 | 79.8 | 358.9 |
|   | 205 | 55.2 | 77.7 | -6.4 | 78.0 | 355.3 |
|   | 180 | 58.2 | 74.4 | -10.0 | 75.0 | 352.3 |
|   | 155 | 61.0 | 68.1 | -14.1 | 69.6 | 348.3 |
|   | 130 | 66.2 | 59.6 | -14.0 | 61.2 | 346.8 |
|   | 105 | 71.4 | 47.7 | -15.1 | 50.0 | 342.5 |
|   | 80 | 76.1 | 36.0 | -14.2 | 38.7 | 338.5 |
|   | 55 | 82.2 | 24.5 | -11.0 | 26.8 | 335.7 |
|   | 30 | 87.8 | 14.0 | -7.8 | 16.0 | 330.7 |
|   | 15 | 91.7 | 6.9 | -6.0 | 9.2 | 319.1 |
| C | 255 | 48.8 | -32.6 | -65.4 | 73.1 | 243.5 |
|   | 230 | 50.6 | -35.6 | -63.8 | 73.1 | 240.8 |
|   | 205 | 53.2 | -39.5 | -61.4 | 73.0 | 237.2 |
|   | 180 | 56.1 | -41.9 | -58.6 | 72.0 | 234.4 |
|   | 155 | 60.4 | -45.6 | -52.2 | 69.3 | 228.9 |
|   | 130 | 65.1 | -43.4 | -47.5 | 64.3 | 227.6 |
|   | 105 | 69.3 | -37.3 | -41.2 | 55.6 | 227.8 |
|   | 80 | 74.5 | -30.0 | -33.6 | 45.0 | 228.2 |
|   | 55 | 81.1 | -21.0 | -24.8 | 32.5 | 229.7 |
|   | 30 | 87.3 | -12.3 | -15.9 | 20.1 | 232.3 |
|   | 15 | 91.2 | -6.6 | -10.0 | 12.0 | 236.8 |

TABLE 8

|   | Duty | L* | a* | b* | C* | h |
|---|---|---|---|---|---|---|
| R | 255 | 41.7 | 77.9 | 44.7 | 89.8 | 29.8 |
|   | 230 | 42.8 | 77.7 | 38.2 | 86.5 | 26.2 |
|   | 206 | 44.5 | 77.0 | 30.3 | 82.8 | 21.5 |
|   | 180 | 46.8 | 74.7 | 21.1 | 77.6 | 15.8 |
|   | 155 | 50.5 | 69.9 | 12.1 | 70.9 | 9.8 |
|   | 130 | 55.5 | 61.7 | 4.6 | 61.9 | 4.3 |
|   | 105 | 62.7 | 50.5 | -0.1 | 50.5 | 359.9 |
|   | 80 | 70.1 | 36.7 | -4.0 | 37.0 | 353.8 |
|   | 55 | 78.1 | 23.9 | -4.9 | 24.3 | 348.5 |
|   | 30 | 85.6 | 13.2 | -4.8 | 14.0 | 340.0 |
|   | 15 | 90.3 | 6.6 | -4.4 | 7.9 | 326.0 |
| V | 255 | 14.2 | 35.3 | -46.0 | 58.0 | 307.5 |
|   | 230 | 14.9 | 41.6 | -53.0 | 67.4 | 306.1 |
|   | 206 | 16.0 | 47.8 | -59.7 | 76.5 | 308.6 |
|   | 180 | 18.4 | 53.4 | -65.6 | 84.6 | 309.1 |
|   | 155 | 22.2 | 57.1 | -69.7 | 90.1 | 309.4 |
|   | 130 | 28.4 | 57.6 | -69.8 | 90.5 | 309.5 |
|   | 105 | 38.3 | 52.3 | -63.8 | 82.5 | 309.3 |
|   | 80 | 50.4 | 41.7 | -52.6 | 67.1 | 308.4 |
|   | 55 | 64.5 | 28.1 | -37.8 | 47.1 | 306.7 |
|   | 30 | 77.9 | 15.6 | -23.4 | 28.2 | 303.7 |
|   | 15 | 86.5 | 7.7 | -14.0 | 16.0 | 298.7 |
| K | 255 | 2.7 | -0.2 | -0.3 | 0.3 | 234.2 |
|   | 230 | 3.4 | -0.2 | 0.3 | 0.3 | 116.6 |
|   | 205 | 5.0 | -0.2 | 1.8 | 1.8 | 97.2 |
|   | 180 | 10.1 | -0.3 | 5.3 | 5.3 | 93.4 |
|   | 155 | 18.8 | -0.7 | 7.0 | 7.0 | 95.6 |
|   | 130 | 29.3 | -0.5 | 8.1 | 8.1 | 93.5 |
|   | 105 | 41.4 | -0.9 | 7.7 | 7.7 | 96.5 |
|   | 80 | 53.1 | -1.1 | 5.3 | 5.4 | 101.9 |
|   | 55 | 66.6 | -0.9 | 2.4 | 2.6 | 109.5 |
|   | 30 | 78.8 | -0.5 | 0.1 | 0.5 | 174.1 |
|   | 15 | 86.3 | -0.2 | -1.4 | 1.4 | 261.1 |

Graphs prepared using the data of Tables 1 to 8 are shown in FIGS. 2 to 6 and FIGS. 8 to 10.

Figure 2:
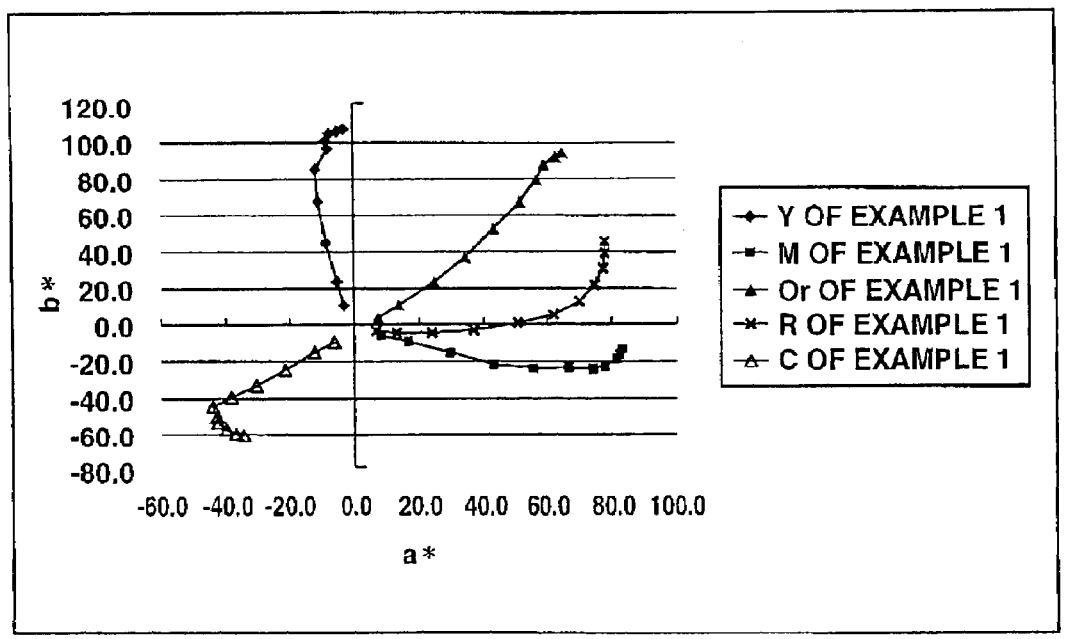
FIG. 2 is a graph showing the relationship between values of a* and b* of a recorded article recorded using the ink set of Example 1.

FIG. 2 is a graph showing the relationship between values of a* and b* of a recorded article recorded using the ink set of Example 1. As shown in FIG. 2, the orange ink and cyan ink of Example 1 were found to have nearly completely opposite hues.

Figure 8:
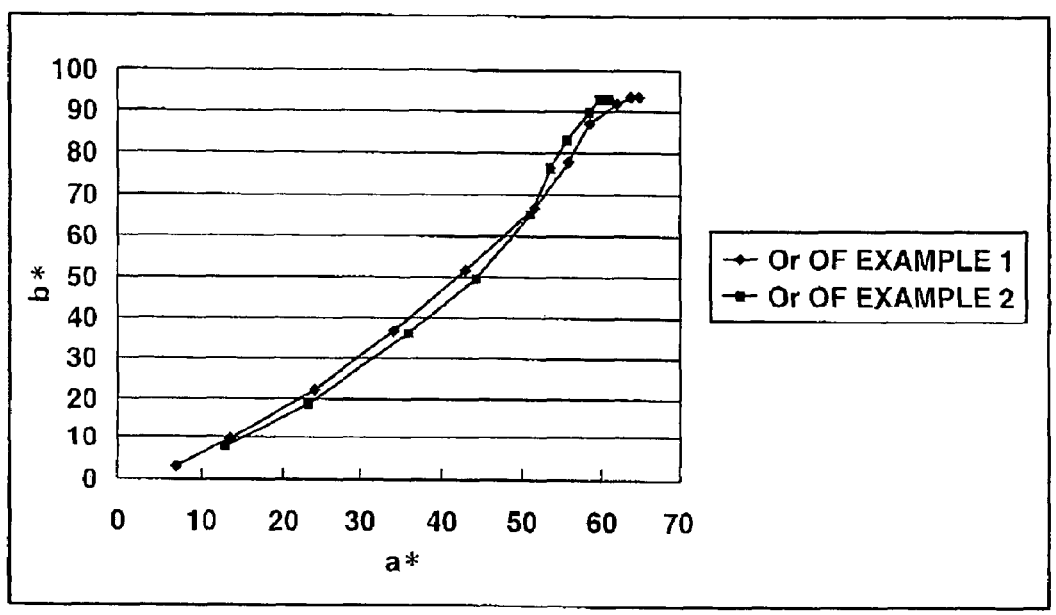
FIG. 8 is a graph showing the relationship between chroma and brightness of recorded articles pertaining to the orange ink composition of Example 1 and the orange ink composition of Example 2.

FIG. 8 is a graph showing the relationship between values of a* and b* of recorded articles recorded using the orange ink of Example 1 and the orange ink of Example 2. As shown in FIG. 8, there was found to be no large differences in color hue between the orange ink of Example 1 and the orange ink of Example 2.

Figure 3:
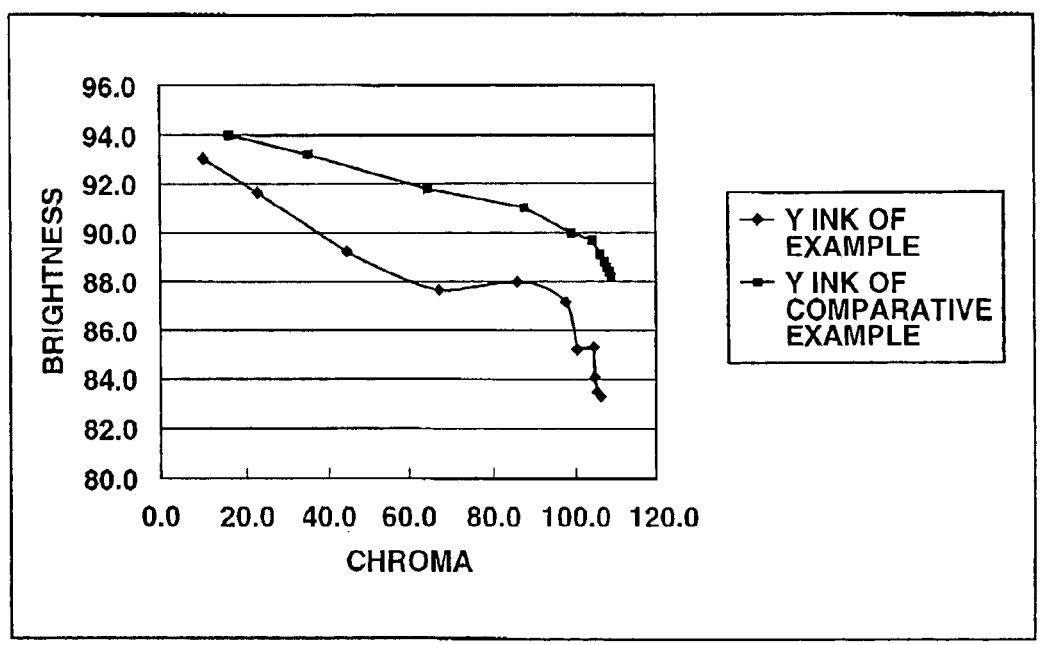
FIG. 3 is a graph showing the relationship between chroma and brightness of recorded articles recorded using the yellow inks of Example 1 and Comparative Example 1.

FIG. 3 is a graph showing the relationship between chroma and brightness of recorded articles recorded using the yellow inks of Example 1 and Comparative Example 1. As shown in FIG. 3, the yellow ink of Example 1 was determined to have lower brightness at the same chroma than the yellow ink of Comparative Example 1.

Figure 4:
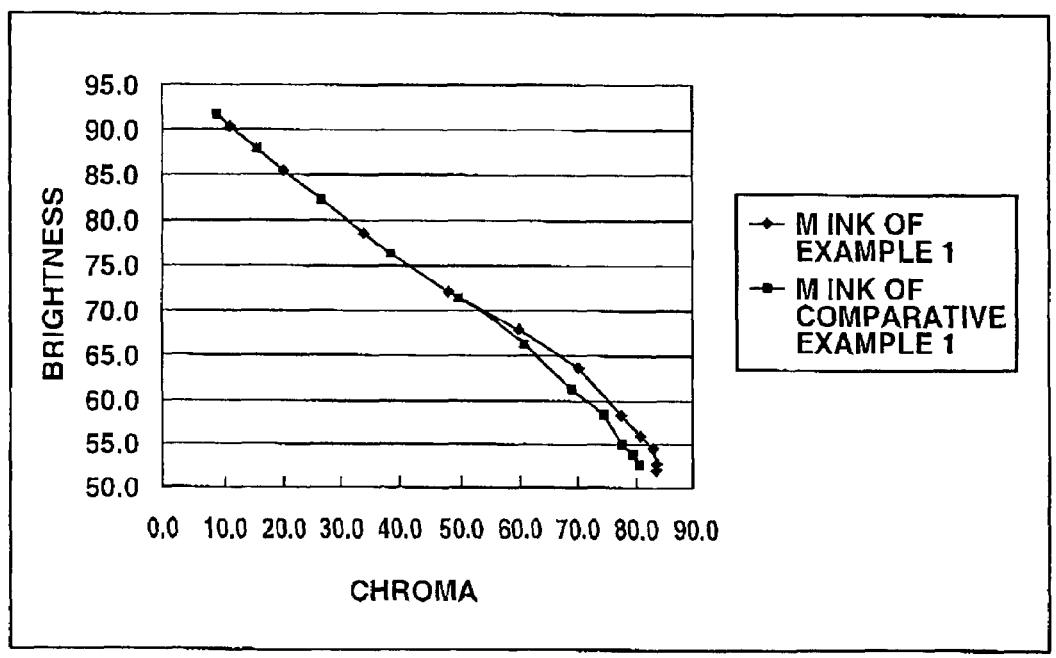
FIG. 4 is a graph showing the relationship between chroma and brightness of recorded articles recorded using the magenta inks of Example 1 and Comparative Example 1.

FIG. 4 is a graph showing the relationship between chroma and brightness of recorded articles recorded using the magenta inks of Example 1 and Comparative Example 1. As shown in FIG. 4, the magenta ink of Example 1 was determined to have higher chroma at the same brightness than the yellow ink of Comparative Example 1.

Figure 5:
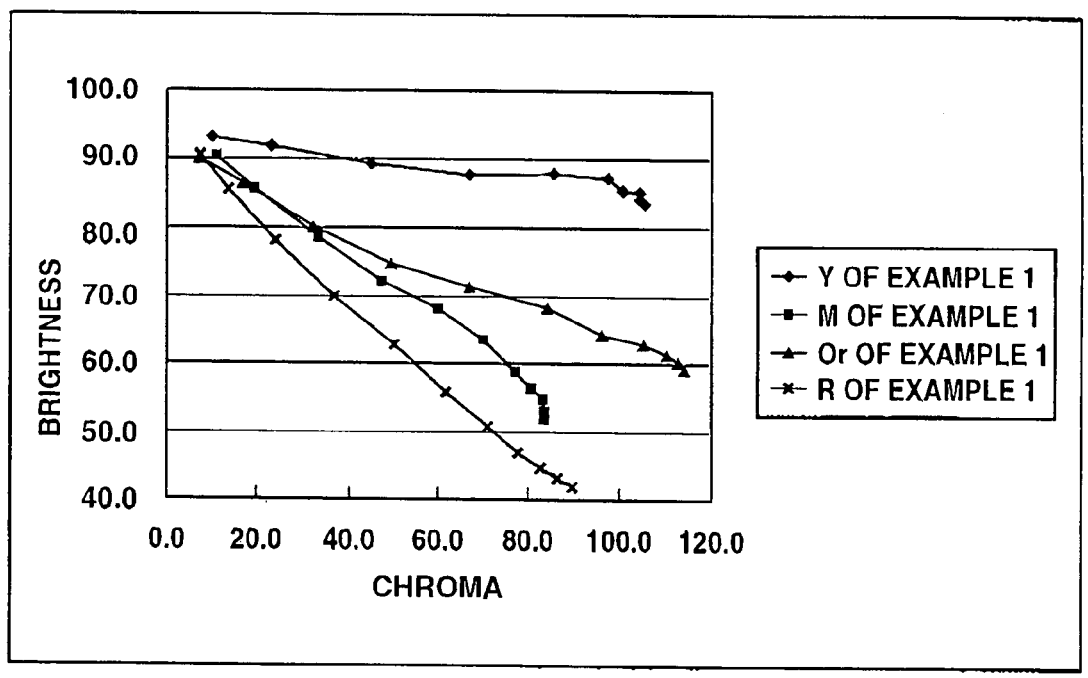
FIG. 5 is a graph showing the relationship between chroma and brightness of a recorded article pertaining to Example 1.

FIG. 5 is a graph showing the relationship between chroma and brightness of a recorded article pertaining to Example 1. As shown in FIG. 5, in Example 1, the orange ink had higher brightness at the same chroma than the magenta ink. In addition, the orange ink had lower brightness at the same chroma than the yellow ink. In addition, the red ink had lower brightness at the same chroma than the magenta ink.

Figure 9:
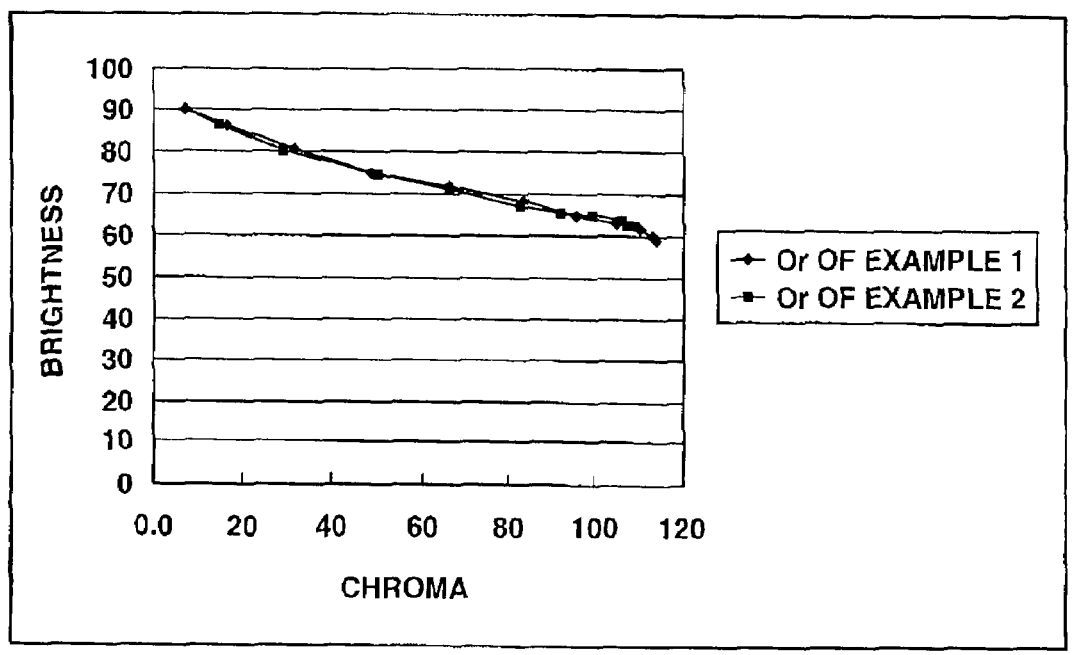
FIG. 9 is a graph showing the relationship between chroma and brightness of recorded articles pertaining to the orange ink composition of Example 1 and the orange ink composition of Example 2.

FIG. 9 is a graph showing the relationship between chroma and brightness of recorded articles recorded using the orange ink of Example 1 and the orange ink of Example 2. As shown in FIG. 9, there was found to be no large difference between the hue of the orange ink of Example 1 and the hue of the orange ink of Example 2.

Figure 6:
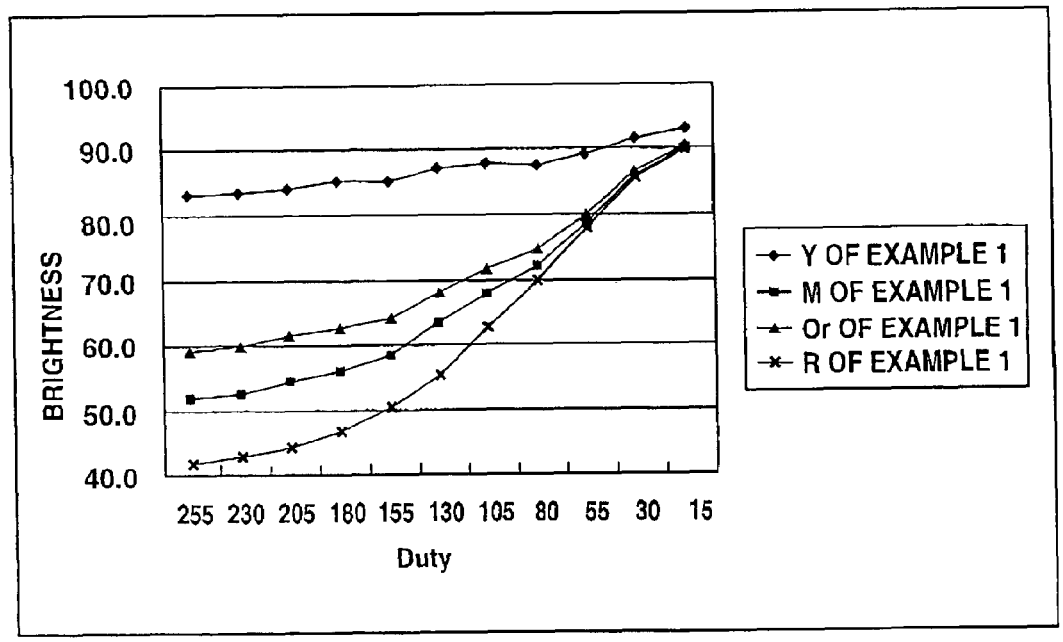
FIG. 6 is a graph showing the relationship between duty and brightness of a recorded article pertaining to Example 1.
Figure 7:
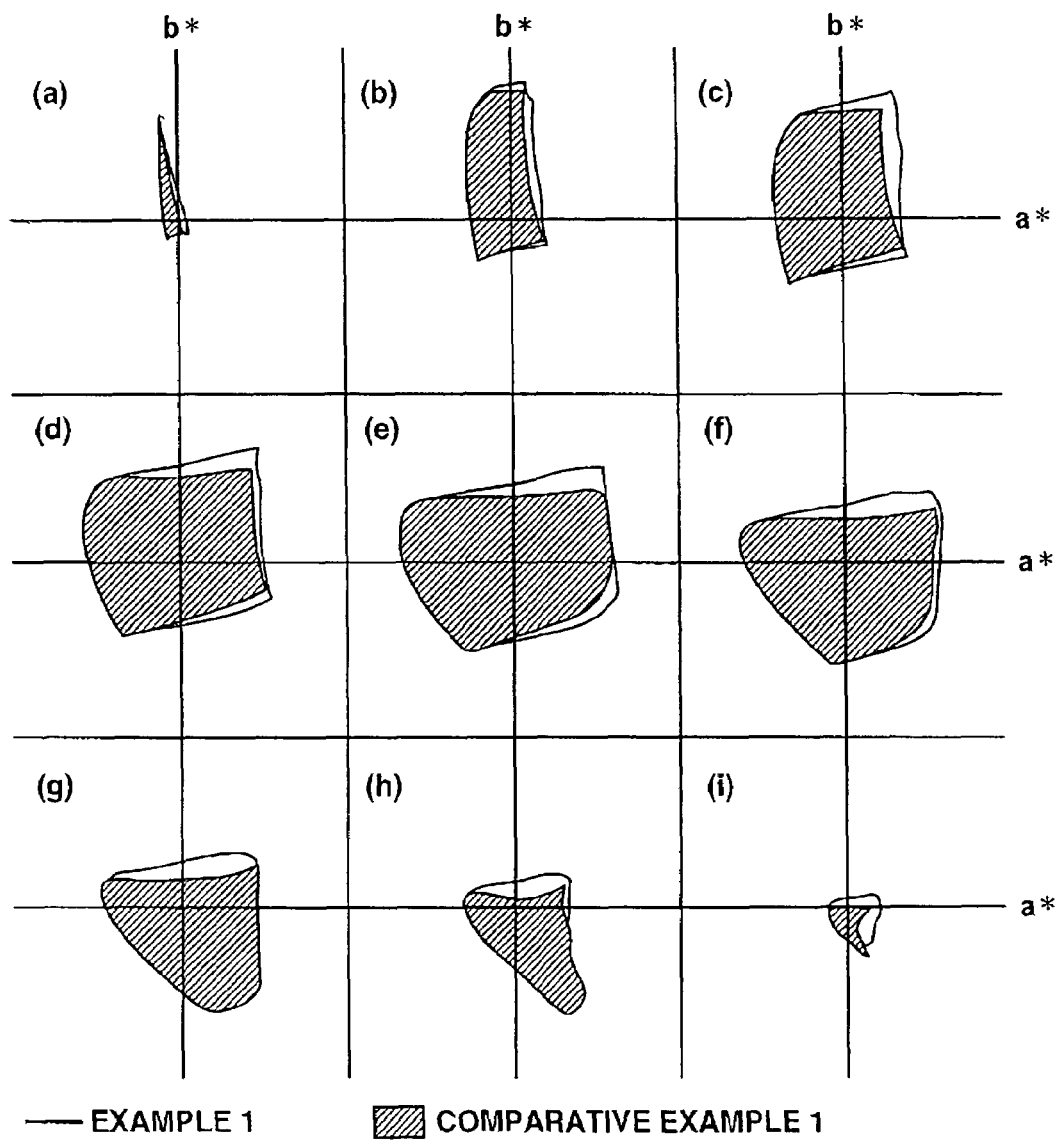
FIG. 7 is a drawing comparing color reproduction areas for patch patterns of the ink sets of Example 1 and Comparative Example 1.

FIG. 6 is a graph showing the relationship between duty and brightness of a recorded article pertaining to Example 1. As shown in FIG. 6, in Example 1, the orange ink had higher brightness than the magenta ink for the same amount of adhered ink. In addition, the orange ink had lower brightness than the yellow ink for the same amount of adhered ink. In addition, the red ink had lower brightness than the magenta ink for the same amount of adhered ink.

Figure 10:
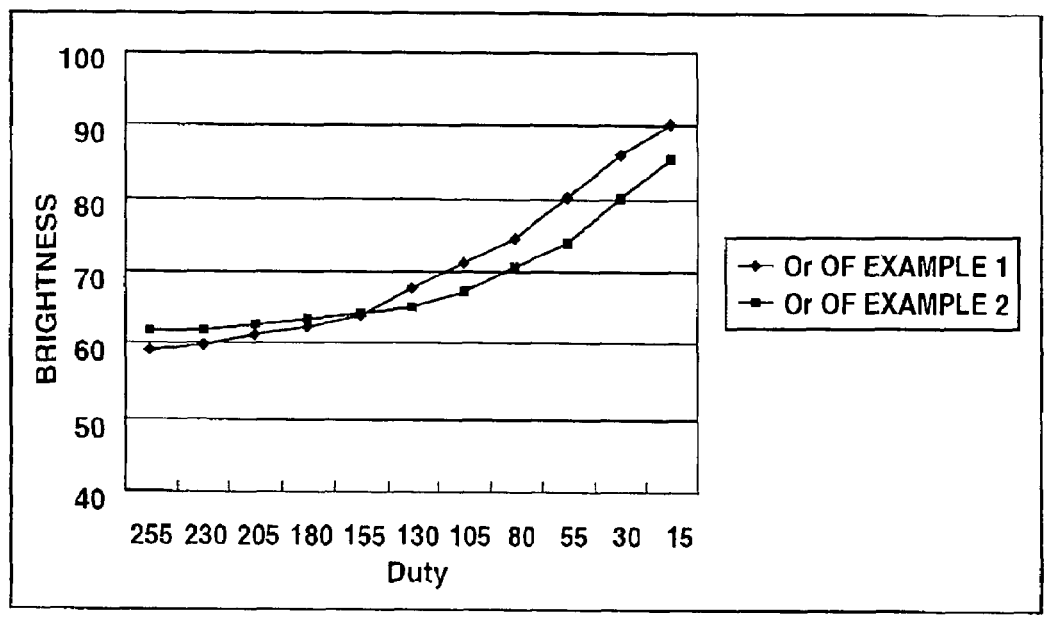
FIG. 10 is a graph showing the relationship between duty and brightness of recording materials pertaining to the orange ink composition of Example 1 and the orange ink composition of Example 2.

FIG. 10 is a graph showing the relationship between duty and brightness of recording materials recorded using the orange ink of Example 1 and the orange ink of Example 2. As shown in FIG. 10, there was determined to be no large difference in brightness between the orange ink of Example 1 and the orange ink of Example 2 for the same amount of adhered ink.

Moreover, evaluations were made of granularity, false contour, prismatic light and color reproducibility.

Evaluation of Granularity

Ink sets of the examples or comparative examples were filled into the PX-G900, and LUT were produced at the same ink weight limiting value. Subsequently, the JIS standard image N1 of "Woman with glass" and 40 types of arbitrarily selected images of infants were recorded on Photo Paper <Gloss> at 14440×720 dpi and 720×720 dpi followed by observing skin granularity.

A: No large change in granularity between 14440×720 dpi and 720×720 dpi, and granularity is not particularly noticeable even at 720×720 dpi.

B: Large change in granularity between 14440×720 dpi and 720×720 dpi, and granularity is noticeable at 720×720 dpi.

Evaluation of Prismatic Light

Ink sets of the examples or comparative examples were filled into the PX-G900, and LUT were produced at the same ink weight limiting value. Subsequently, the JIS standard image N1 of "Woman with glass" and 40 types of arbitrarily selected images of infants were recorded on Photo Paper <Gloss> at 14440×1440 dpi followed by observing from various angles with an F11 light source at a distance of 10 or 50 cm from the recorded articles.

A; Little green and red light at 10 cm, and no green or red light at 50 cm.

B: Conspicuous green and red light at 10 cm, and noticeable green and red light at 50 cm.

Evaluation of False Contour

Ink sets of the examples or comparative examples were filled into the PX-G900, and LUT were produced at the same ink weight limiting value. Subsequently, 40 types of arbitrarily selected images of sunrises and sunsets were recorded on Photo Paper <Gloss> at 14400×1440 dpi followed by observing contrast of the contours of the orbs of the sun from yellow to red.

A: Orbs reproduced with good contrast.

B: Recorded article depicts the orbs separated into a yellow orb and a red orb, and the orbs are not reproduced with good contrast.

Evaluation of Color Reproducibility (Gamut Volume)

Ink sets of the examples or comparative examples were filled into the PX-G900, and LUT were produced at the same ink weight limiting value. Subsequently, images enabling measurement of maximum color reproducibility were recorded on Photo Paper <Gloss> at 14400×720 dpi to obtain recorded articles.

Gamut volume was then calculated from the L*, a* and b* values obtained from the above measurements based on a value of 1 for the gamut volume when all of the values of L*, a* and b* as defined by CIE were 1, followed by evaluation according to the criteria indicated below.

A: Gamut volume of 750,000 or more

B: Gamut volume of less than 750,000

The results of the evaluations described above are shown in Table 9.

TABLE 9

|  | Example 1 | Example 2 | Comparative Example 1 | Comparative Example 2 |
| --- | --- | --- | --- | --- |
| Granularity | A | A | B | B |
| False contour | A | A | B | B |
| Prismatic light | A | A | B | B |
| Gamut volume | A | A | B | b |

As shown in Table 9, the ink sets of Examples 1 and 2 were determined to be able to satisfy granularity suppression, false contour suppression, prismatic light suppression and color reproducibility.

Patch patterns of the ink sets of Example 1 and Comparative Example 1 are shown in FIGS. 7A to 7I, while patch patterns of the ink sets of Example 2 and Comparative Example 2 are shown in FIGS. 11A to 11I. In FIG. 7 and FIG. 11, A represents drawings comparing color reproduction areas at high brightness areas (L* value=90), B represents drawings comparing color reproduction areas at high brightness areas (L* value=80), C represents drawings comparing color reproduction areas at high brightness areas (L* value=70), D represents drawings comparing color reproduction areas at medium brightness areas (L* value=60), E represents drawings comparing color reproduction areas at medium brightness areas (L* value=50). F represents drawings comparing color reproduction areas at medium brightness areas (L* value=40), G represents drawings comparing color reproduction areas at low brightness areas (L* value=30), H represents drawings comparing color reproduction areas at low brightness areas (L* value=20), and I represents drawings comparing color reproduction areas at low brightness areas (L* value=10).

For the purpose of discussion, the ink sets of Examples 1 and 2 are superior to the ink sets of Comparative Examples 1 and 2 with respect to the points indicated below.

(1) Since the yellow ink has low brightness, the amount of cyan ink generated to lower brightness for skin color can be reduced, thereby making it possible to suppress green transfer in the case of superimposed dots.

(2) Since the magenta ink has high chroma, the generation of orange ink and red ink can be effectively suppressed, thereby making it possible to suppress false contours.

(3) Since the cyan ink contains titanium dioxide, red light of interference color can be suppressed, thereby making it possible to suppress prismatic light by acting synergistically with the effect of (1) above.

(4) Since the orange ink has higher brightness and higher chroma than the Magenta ink and has higher chroma and lower brightness than the yellow ink, there is no deterioration of granularity even if the orange ink is generated aggressively. Accordingly, since the orange ink can be used in place of the yellow ink, the frequency at which the dots of the cyan ink and the dots of the yellow ink are superimposed can be effectively reduced, thereby making it possible to suppress green transfer. In addition, since the difference in hue angles between the cyan ink and the orange ink is nearly 180 degrees, in the case cyan ink is generated, brightness can be effectively reduced without the occurrence of green transfer.

(5) Although the red ink has higher chroma and lower brightness than the magenta ink, since the brightness of the yellow ink is low, there is no deterioration of granularity, and/or since the chroma of the magenta ink is high and/or the chroma of the orange ink is high, red ink can be generated while suppressing false contours, thereby making it possible to reduce brightness for skin color at the same hue.

Figure 11:
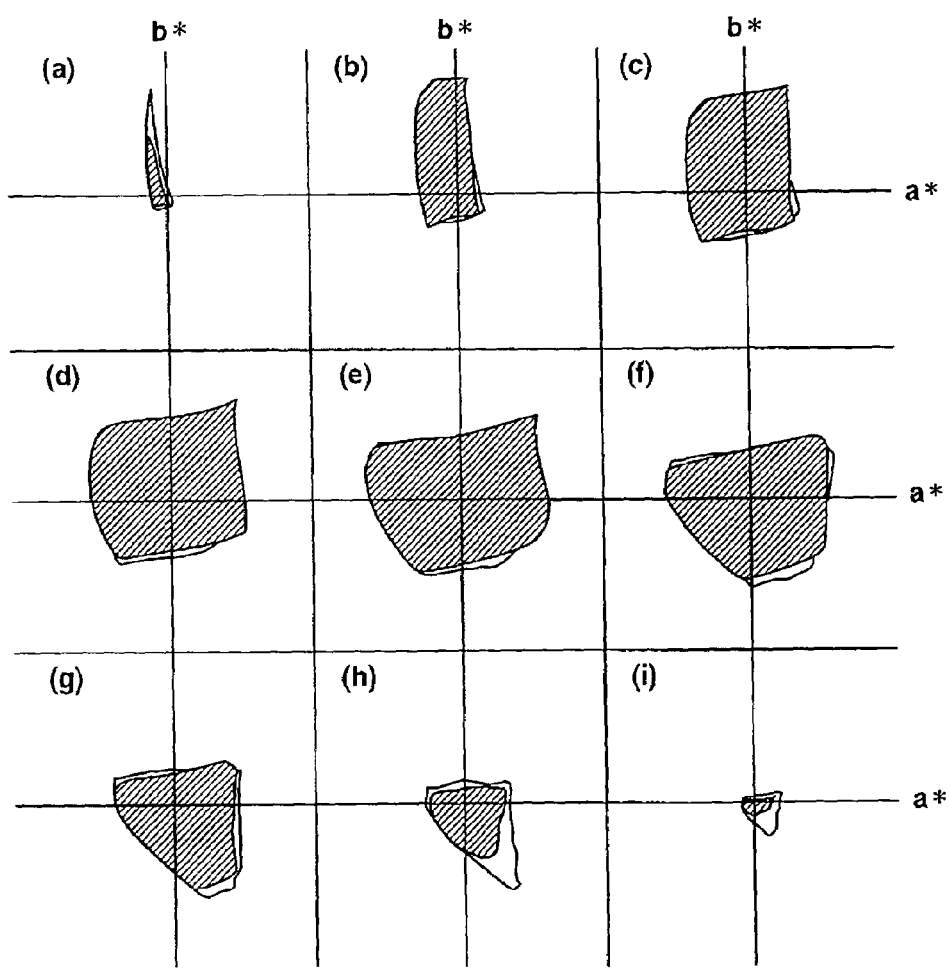
FIG. 11 is a drawing comparing color reproduction areas for patch patterns of the ink sets of Example 2 and Comparative Example 2.

(6) As shown in FIG. 11, although color reproducibility of blue at dark areas is superior for Comparative Example 2 (thin solid lines), the color reproducibility of yellow at dark areas is poor. Consequently, there is the potential for the occurrence of the problem in which false contours tend to occur easily from areas of high brightness to areas of low brightness. In contrast, this problem does riot occur in Example 2 (filled in portions).

According to the present invention, an ink set can be provided capable of satisfying granularity suppression, false contour suppression, prismatic light suppression, colors reproducibility and gloss during recording.

What is claimed is:

1. An ink set, comprising at least three colors of ink consisting of a yellow ink, in which the hue angle ∠H° defined in the CIELAB color space on a recording medium is within the range of about 80° to about 110°, magenta ink, in which the hue angle ∠H° is within the range of about 330° to about 360°, and a cyan ink, in which the hue angle ∠H° is within the range of about 230° to about 260°, and the following ink (A) and the following ink (B):

ink (A): ink in which the hue angle ∠H° is within the range of about 0° to about 80°; and, ink (B): ink in which the hue angle ∠H° is within the range of about 0° to about 80°;

wherein, the ink (A) has higher chroma and lower brightness than the magenta ink, the ink (B) has higher chroma and higher brightness than the magenta ink and has higher chroma and lower brightness than the yellow ink, the hue angle (∠H°) is determined according to ∠H°=$\tan^{-1}$(b*/a*)+180 (when a*<0) or according to ∠H°=$\tan^{-1}$(b*/a*)+360 (when a*>0), and a* and b* represent a perceptive chromaticity index in the CIELAB color space.

2. The ink set according to claim 1, wherein the yellow ink and the cyan ink contain a complex pigment.

3. The ink set according to claim 1, wherein the yellow ink contains C.I. pigment yellow 74 and C.I. pigment yellow 129 as pigments, and the cyan ink contains C.I. pigment blue 15:4 as pigment.

4. The ink set according to claim 1, wherein the cyan ink contains a white pigment.

5. The ink set according to claim 1, wherein the magenta ink contains a solid solution of γ-type C.I. pigment violet 19 and C.I. pigment red 202 as pigment.

6. The ink set according to claim 1, wherein the ink (A) is a red ink.

7. The ink set according to claim 1, wherein the ink (A) is a red ink containing C.I. pigment red 177 and/or C.I. pigment red 179 as pigment.

8. The ink set according to claim 1, wherein the ink (B) is an orange ink.

9. The ink set according to claim 1, wherein the ink (B) is an orange ink containing C.I. pigment orange 43 and/or C.I. pigment red 242 as pigments.

10. The ink set according to claim 1, wherein the mixing ratio of C.I. pigment orange 43 to C.I. pigment red 242 in the ink (B) is 4:1 to 2:1.

11. The ink set according to claim 1, further comprising a blue ink containing C.I. pigment blue 15:1 and/or C.I. pigment violet 23 as pigments.

12. The ink set according to claim 1, wherein the pigment solid component concentration in each ink is less than 3% by weight.

13. The ink set according to claim 1, further comprising a black ink, and the black ink contains C.I. pigment black 7 as pigment.

14. The ink set according to claim 1, further comprising a black ink, and the pigment solid component concentration of the black ink is 1% by weight or less.

15. The ink set according to claim 1, further comprising a clear ink.

16. The ink set according to claim 1, containing an optionally branched alkanediol having 5 to 10 carbon atoms at 3 to 15% by weight.

17. The ink set according to claim 1, containing a surfactant in the form of a polyorganosiloxane.

18. The ink set according to claim 1, containing a surfactant in the form of a polyorganosiloxane represented by the following general formula:

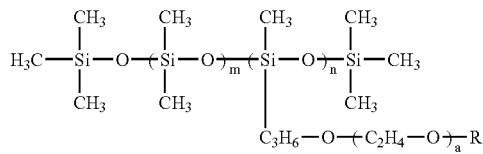

wherein, R represents a hydrogen atom or a methyl group, a represents an integer of 7 to 11, m represents an integer of 20 to 70, and n represents an integer of 2 to 5.

19. The ink set according to claim 18, further containing a surfactant in the form of a polyorganosiloxane represented by the following general formula:

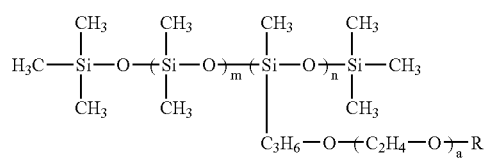

wherein, R represents a hydrogen atom or a methyl group, a represents an integer of 9 to 13, m represents an integer of 2 to 4, and n represents an integer of 1 to 2.

* * * * *